United States Patent [19]

Sasaki

[11] Patent Number: 5,226,116
[45] Date of Patent: Jul. 6, 1993

[54] APPARATUS FOR CONVERTING VECTOR DATA OF CHARACTERS INTO DOT DATA HAVING MEANS FOR REDUCING FREQUENCY OF REQUIRED DATA CONVERSION

[75] Inventor: Ichiro Sasaki, Nagoya, Japan

[73] Assignee: Brother Kogyo Kabushiki Kaisha, Nagoya, Japan

[21] Appl. No.: 524,970

[22] Filed: May 18, 1990

[30] Foreign Application Priority Data

May 29, 1989 [JP] Japan .................. 1-135625

[51] Int. Cl.[5] ............................................ G06F 15/62
[52] U.S. Cl. ................................. 395/150; 395/151
[58] Field of Search ............... 395/150, 151, 137, 425; 340/751, 752, 735, 790, 739, 799; 358/426; 400/121; 364/900, 523, 518, 419; 382/47, 46

[56] References Cited

U.S. PATENT DOCUMENTS

| | | | |
|---|---|---|---|
| 4,573,199 | 2/1986 | Chen et al. | 382/47 |
| 4,745,561 | 5/1988 | Hirosawa et al. | 364/523 |
| 4,748,443 | 5/1988 | Uehara et al. | 340/751 |
| 4,827,254 | 5/1989 | Nishiyama | 340/390 |
| 4,843,593 | 6/1989 | Yanaru et al. | 364/900 |
| 4,959,801 | 9/1990 | Apley et al. | 364/518 |
| 5,018,883 | 5/1991 | Fujita | 400/121 |

FOREIGN PATENT DOCUMENTS 0095536 12/1983 European Pat. Off.
0130245 1/1985 European Pat. Off.

Primary Examiner—Heather R. Herndon
Assistant Examiner—Joseph H. Feild
Attorney, Agent, or Firm—Oliff & Berridge

[57] ABSTRACT

An apparatus including a converting device for converting vector data of an input character into dot data for outputting the input character in a specified mode, a memory for storing the dot data, and a controller operable prior to the data conversion, for determining whether one of a first and a second case is satisfied. The first case is satisfied where the dot data to be prepared from the vector data of the input character are stored in the memory, and the second case is satisfied where basic dot data for outputting the input character in a mode different from the specified mode are stored in said dot data memory means. The converting device omits the data conversion in the first and second cases. A dot data changing device operable in the second case is provided to change the basic dot data according to a predetermined rule depending upon the specified and different modes, so as to obtain the dot data for outputting the input character in the specified mode.

10 Claims, 6 Drawing Sheets

FIG. 3

| CASES | STORED CHARACTER | | | | | CURRENT CHARACTER = UPRIGHT OR LEFT-TURNED? | STORED CHARACTER = UPRIGHT OR LEFT-TURNED? | |
|---|---|---|---|---|---|---|---|---|
| | CODE DATA | SIZE DATA | ATTITUDE DATA | TYPE STYLE DATA | | | | |
| 1 | ○ | ○ | ○ | ○ | — | — | ① |
| 2a | ○ | ○ | ○ | × | — | — | ② |
| 2b | ○ | ○ | × | ○ | YES | YES | ③ |
| 2c | ○ | ○ | × | × | YES | YES | ④ |
| 3a | × | | | | | | ⑤ |
| 3b | ○ | × | — | — | — | — | ⑥ |
| 3c | ○ | ○ | × | — | NO | — | ⑦ |
| 3d | ○ | ○ | × | — | YES | NO | ⑧ |

○ : IDENTICAL WITH THOSE OF THE CURRENT CHARACTER
× : DIFFERENT FROM THOSE OF THE CURRENT CHARACTER
— : EITHER IDENTICAL OR DIFFERENT (EITHER YES OR NO)

APPARATUS FOR CONVERTING VECTOR DATA OF CHARACTERS INTO DOT DATA HAVING MEANS FOR REDUCING FREQUENCY OF REQUIRED DATA CONVERSION

BACKGROUND OF THE INVENTION

1. Field of the Invention

The present invention relates to an apparatus for converting vector data representative of the outline of input characters such as alphabetic letters, Chinese characters, numerals and symbols, into corresponding dot data. More particularly, the present invention is concerned with a technique useful for reducing the time required for preparing dot data representative of characters.

2. Discussion of the Prior Art

For printing, displaying or otherwise reproducing or outputting input characters on an output medium such as a paper and a display screen, it is commonly practiced to prepare a batch of dot data consisting of bits indicative of the presence or absence of image dots to be formed at the positions of picture elements, which are the smallest subdivisions of an image to be outputted. If an output device such as a printer is adapted to store multiple sets of dot data representative of all characters that can be outputted on the output medium, the output device requires a memory having a large capacity. In view of this requirement, a set of vector data which defines the outline of each character available on the output device is usually stored in a memory, and the vector data of each input character are converted into the corresponding set of dot data for outputting the input character.

A data converting apparatus capable of converting vector data into dot data as described above is commonly arranged such that the output mode in which the characters are outputted can be changed or selected as desired. For instance, the characters can be printed or displayed in a selected one of different sizes (for example, 12-point or 20-point size), and/or in a selected one of different attitudes (for example, upright attitude and left-turned attitude as illustrated in FIG. 5). Further, the characters may have different type styles. For example, a character can be outputted in either the standard style in which the characters extend along their width-wise centerline, or in the italic style in which the characters are inclined with respect to the centerline, as indicated in FIG. 5. Thus, the characters are outputted in the specified mode in terms of one or more output conditions such as the character size, printing attitude and type style. Accordingly, the data converting apparatus should be adapted to be able to convert the vector data of each input character into corresponding dot data, so that the obtained dot data meet or satisfy the specified output mode, which may be a combination of two or more output conditions. For example, a set of dot data must be prepared so that the character is printed in the 10-point size, in the standard style and in the upright attitude.

Generally, a text to be outputted includes two or more occurrences of same characters. In this case, therefore, the conversion of the vector data into the dot data is effected two or more times for the same character which appears at two or more positions of the text. Since the data conversion requires a considerably long time, the repetition of the data converting operations for the same character results in unnecessarily increasing the overall time required to prepare a batch of dot data of the entire text. This waste of the data processing time may be avoided if the data converting apparatus is constructed to include: (a) V/D conversion means for converting vector data of an input character into dot data for reproducing or outputting the input character in a specified output mode on an output medium; (b) dot data memory means for storing the dot data prepared by the V/D conversion means; and (c) conversion control means operable prior to the data conversion by the V/D conversion means, for determining whether or not the dot data to be prepared by conversion from the vector data of the input character by the V/D conversion means are currently stored in the dot data memory, and activating the V/D conversion means to convert the vector data into the dot data if the dot data are not stored in the dot data memory, while omitting or inhibiting the conversion by the V/D conversion means if the dot data are stored in the memory.

In the known data converting apparatus indicated above, the dot data to be prepared by the V/D conversion means by conversion of the vector data of the input character permit the input character to be outputted in the specified output mode, namely, represent the kind of the input character, and reflect the specified output condition or conditions such as the character size, attitude and type style. The conversion of the vector data into the dot data is not effected where the dot data memory has already stored dot data identical with the dot data of the input character to be prepared by the V/D conversion means. In other words, the data conversion is effected only when the dot data for outputting the input character in the specified mode have not been stored in the dot data memory. Accordingly, the data conversion will not be repeated for preparing the dot data for outputting the same character in the same output mode, whereby the time for preparing the dot data for the input characters is considerably reduced.

However, an applicant's study on this type of data converting apparatus revealed a room for a further improvement in the apparatus. The applicant found it possible to omit the conversion of the vector data into the dot data even where dot data for outputting the same character as the input character in a mode different from the output mode of the input character are stored in the dot data memory, that is, even where the output mode of the input character is different from that of the dot data stored in the dot data memory for the same character.

SUMMARY OF THE INVENTION

It is therefore an object of the present invention to provide a data converting apparatus for converting vector data of an input character into dot data, which permits further reduction in the time required to prepare a batch of dot data for an input text to be outputted.

The above object may be achieved according to the principle of the present invention, which provides a data converting apparatus, comprising: V/D conversion means for converting vector data representative of an outline of an input character into dot data for recording, displaying or otherwise outputting the input character in a specified output mode on an output medium such as a recording medium and a display screen; dot data memory means for storing the dot data prepared by the V/D conversion means; conversion control means operable prior to the data conversion by the V/D conversion means, and dot data changing means responsive to the conversion control means. The conversion control means determines whether one of a first and a second case is satisfied. The first case is satisfied where the dot data to be prepared by conversion from the vector data of the input character by the V/D conversion means are stored in the dot data memory means, while the second case is satisfied where basic dot data for outputting the input character in a different output mode different from the specified output mode are stored in the dot data memory means. The conversion control means inhibits the V/D conversion means from effecting the data conversion in the first and second cases. In the second case, the dot data changing means operates for changing the basic dot data according to a predetermined rule depending upon the specified and different output modes, so as to obtain the dot data for outputting the input character in said specified output mode.

In the data converting apparatus of the present invention constructed as described above, the conversion of the vector data of the input character to the dot data is omitted not only in the first case where the dot data for outputting the input character in the specified output mode are already stored in the dot data memory means, but also in the second case where basic dot data which represent the input character but cause the input character to be outputted in an output mode different from the output mode specified for the input character are stored in the dot data memory. In the second case, the basic dot data stored in the dot data memory means are changed to the dot data for outputting the input character in the specified mode. This change is effected according to a predetermined rule which is determined by the specified output mode of the input character and the different output mode associated with the basic dot data. Namely, the output mode of the basic dot data may be changed to the specified output mode by changing the basic dot data, while maintaining or substantially maintaining the outline or basic pattern of the character represented by the basic dot data, which outline or basic pattern is identical with that of the input character. This change of the basic dot data into the desired dot data is simpler than the conversion of the vector data into the dot data, and can be effected in a shorter time.

According to the present invention as described above, the time required to prepare a batch of dot data for outputting characters of a text in respective specified modes can be effectively reduced, since the conversion of the vector data of an input character to the dot data is omitted in the case where basic dot data which permit the input character in a mode other than the specified mode are already stored in the dot data memory, as well as in the case where the dot data which permit the input character in the specified mode are stored in the dot data memory.

The output mode of each input character is specified or determined by one or more output conditions such as the size, attitude and type style in which the character is printed, displayed or otherwise outputted. Even where the outline of the input character is the same as that of a character represented by basic dot data stored in the dot data memory, the output mode of the input character may be different from that of the character stored in the dot data memory. For instance, the basic dot data stored in the dot data memory may be formulated to output the input character in an attitude and/or type style different from the attitute and/or the type style of the stored character. This is the situation where the second case is satisfied, and the basic dot data are changed to the dot data that can be used to output the input dot data in the specified output mode.

For example, the input character may take either the nominal upright attitude or the 90°-turned attitude rotated by 90° clockwise or counterclockwise from the nominal upright position about the center of the character, as indicated in FIG. 5. If the input character has one of the upright and 90°-turned attitudes while a character stored in the dot data memory has the other attitude, the dot data for outputting the input character in the specified output mode can be obtained by merely changing the basic dot data representative of the stored character such that the attitude of the stored character is rotated by 90° in the clockwise or counterclockwise direction about the center of the stored character. This is one of the situations which satisfy the second case indicated above.

The second case may also be satisfied where the input character has a standard type style while a character represented by basic dot data stored in the dot data memory means has an inclined type style such as the italic style, for example. In this second case, the basic dot data for outputting the input character in the italic style are changed into the appropriate dot data for outputting the input character in the standard type style, such that the segments of the outline of the stored italic character above the height-wise centerline of the character are shifted rightward in the direction of width of the character while the segments below the centerline are shifted leftward, and such that the amount of shifting of the outline in the direction of width of the character increases with the distance from the center in the direction of height of the character.

The dot data memory may be a cache memory which has dot data memory locations assigned to store respective dot data bits indicative of the presence or absence of image dots to be formed at a corresponding one of positions of a matrix of picture elements which corresponds to a matrix of dots for defining each input character. In the second case indicated above, the memory locations of the dot data bits of the basic dot data are changed according to the predetermined rule, which is determined, for example, by the attitudes and/or type styles of the input character and the character represented by the basic dot data.

BRIEF DESCRIPTION OF THE DRAWINGS

The above and optional objects, features and advantages of the present invention will be better understood by reading the following description of a presently preferred embodiment of the invention, when considered in connection with the accompanying drawings, in which:

FIG. 3 is a view showing eight different cases which are dealt with by the control program of the flow chart of FIG. 2;

FIGS. 4(a), 4(b) and 4(c) are views illustrating examples of dot data conversion implemented by the data converting apparatus.

DETAILED DESCRIPTION OF THE PREFERRED EMBODIMENT

Figure 1:
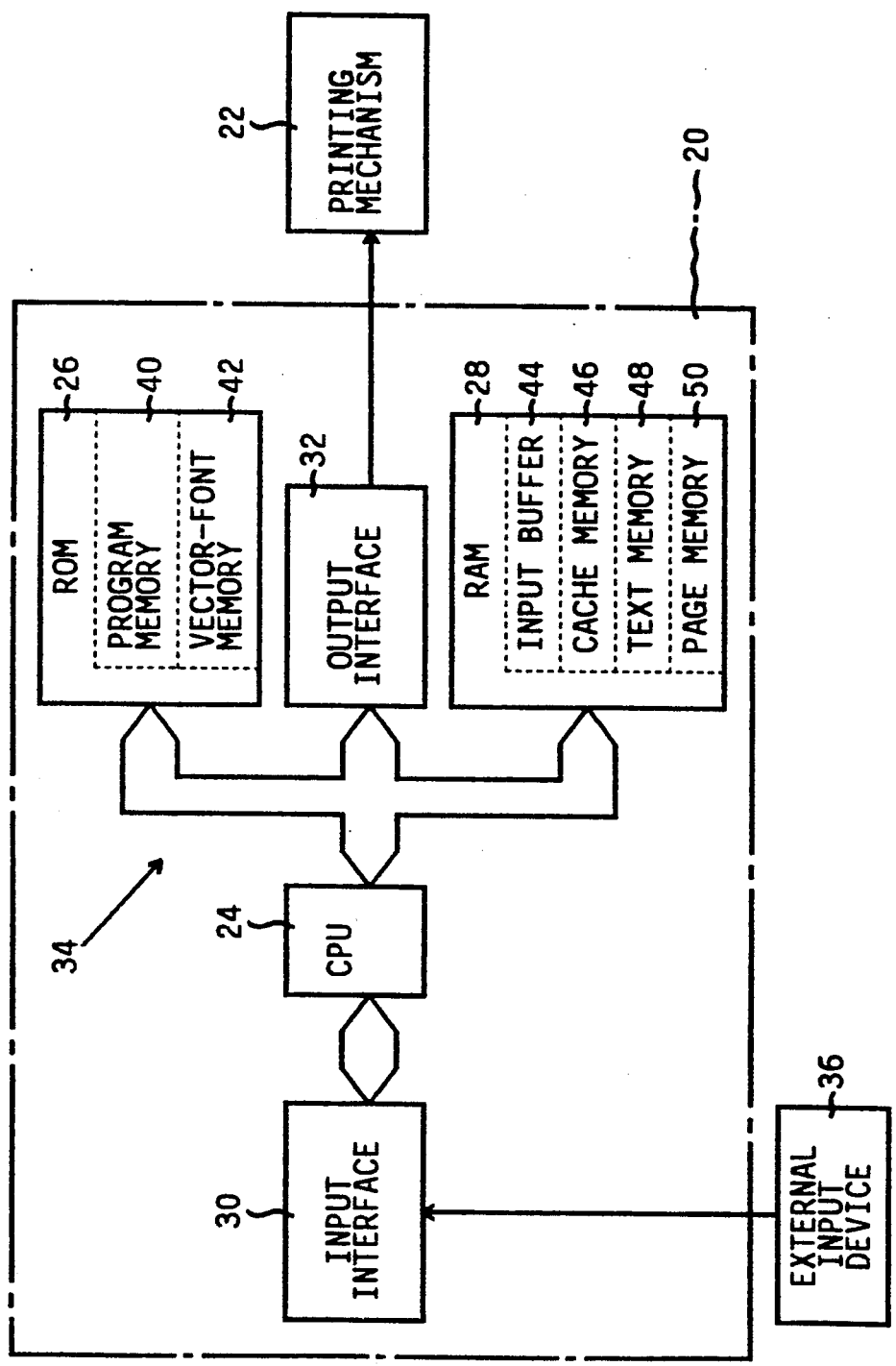
FIG. 1 is a schematic block diagram showing a control system of a laser printer, which incorporates one embodiment of a data converting apparatus of the present invention.

Referring first to FIG. 1, the laser printer is equipped with a main control device 20 principally constituted by a computer, and a printing mechanism 22 constructed to print characters such as alphabetic letters, Chinese characters and symbols on an output medium in the form of a recording medium such as a sheet of paper. The main control device 20 includes a CPU (central processing unit) 24, a ROM (read-only memory) 26, a RAM (random-access memory) 28, an input interface 30, an output interface 32, and a bus 34 for interconnecting these elements.

The main control device 20 is connected to an external input device 36 through the input interface 30, and to the printing mechanism 22 through the output interface 32. The main control device 20 receives necessary data from the external input device 36.

The ROM 26 includes a program memory 40 which stores various control programs such as a program for executing a data converting routine illustrated in the flow chart of FIG. 2. The ROM 26 further includes a VECTOR-FONT memory 42 which stores sets of code data indicative of respective characters to be printed, and sets of vector data corresponding to the respective sets of code data, so that the sets of vector data can be designated by the respective sets of code data when the code data are received from the external input device 36.

The laser printer is adapted to print characters selectively in different sizes, for example, 4.8-point, 10-point, 12-point or 20-point size. The character size is a condition which determines the mode in which the characters are printed.

The laser printer is capable of printing characters such that the attitude of the characters is selected within an angular range of 90° between 0° and 90° positions. Namely, the characters to be printed can be rotated in the counterclockwise direction by a desired angle up to 90°, about the center of each character, from the nominal 0° position corresponding to the normal upright attitude toward the 90°-rotated position corresponding to the left-turned attitude. For example, the upright attitude or the 0° position is selected when the direction of lines of characters to be printed on the recording medium is parallel to the laser scanning direction or printing direction, and the left-turned attitude or 90°-rotated position is selected when the direction of the lines of characters to be printed is perpendicular to the printing direction.

The present laser printer is also adapted to print a character in the standard type style or the italic type style. The type style is another condition which determines the output mode of the character.

Accordingly, the external input device 36 is adapted to provide the laser printer with the printing data which include: (a) code data representative of characters (herein-after referred to as "input characters" where appropriate) that form a given text to be printed; (b) print position data representative of printing positions at which the individual characters are printed on the recording medium; (c) size data representative of the sizes of the characters; (d) attitude data indicative of the angular position or attitude of the characters; and (e) type style data indicative of either the standard type style or the italic type style of the characters. The printing data received by the laser printer are stored in an input buffer 44 of the RAM 28.

The RAM 28 further includes a cache memory 46, a text memory 48 and a page memory 50.

The cache memory 46 has a dot data area for storing sets of dot data (basic dot data) representative of a plurality of characters, and a control data area for storing: code data representative of each input character; address data representative of an address of the dot data area at which the set of dot data for each character is stored; and size data, attitude data and type style data indicative representative or of the size, attitude and type style of each input character, which determine the output mode in which the character is printed. The dot data area consists of memory locations assigned to dot data bits corresponding to picture elements (smallest subdivisions of an image printable by the laser printer). When an image dot is formed at the position of a given picture element, a dot data bit "1" is stored in the corresponding memory location of the dot data area. When an image dot is not formed at that printing position, a dot data bit "0" is stored at the corresponding memory location.

The cache memory 46 is adapted such that the batch of data for the character whose printing data were received at the earliest time is replaced by the batch of data for the character whose printing data is currently received, where the storage capacity of the cache memory 46 is exceeded if the data for the last received character are stored in the cache memory 46. The content of the cache memory 46 is not erased when the laser printer is turned off.

The text memory 48 stores the print position data of each input character to be printed, and the address data representative of the address of the dot data area of the cache memory 46 at which the dot data representative of each character are stored.

The page memory 50 has memory locations assigned to dot data bits corresponding to the picture elements which cover one page of text to be printed. That is, the page memory 50 can store a batch of dot data corresponding to one page of the recording medium. As in the dot data area of the cache memory 46, a dot data bit "1" is stored at each memory location corresponding to the picture element at which an image dot is formed, and a dot data bit "0" is stored at each memory location corresponding to the picture element at which an image dot is not formed.

There will be described an operation of the laser printer which incorporates the data converting apparatus constructed according to one embodiment of the present invention.

When power is applied to the laser printer, the CPU 24 receives from the external input device 36 a batch of printing data of a text to be printed, which consists of code data, print position data, size data, attitude data and type style data for each of the characters of the text. The received batch of printing data are stored in the input buffer 44. When a printing start command is received by the CPU 24, a data converting routine illustrated in the flow chart of FIG. 2 is executed.

The data converting routine will be briefly explained first.

Prior to converting vector data corresponding to code data of each input character to dot data for printing the input character in the specified output mode specified by the size, attitude and type style data, the CPU 24 determines which one of the following three cases is satisfied for the character:

1) First Case I

An operation to convert the vector data into the corresponding dot data can be omitted, since a set of dot data stored in the cache memory 46 can be used for printing the relevant input character in the specified mode determined by the size, attitude and type style data.

2) Second Case II

A set of dot data for the relevant character can be prepared by changing or modifying a set of dot data (basic dot data) stored in the cache memory 46, without directly converting the vector data of the relevant character into the dot data used for printing the character in the specified mode.

3) Third Case III

A set of dot data for printing the relevant character can be obtained only by directly converting the vector data of that character into the actually used dot data.

According to the result of the determination, the dot data for each character is prepared and stored in the cache memory 46.

Referring next to the flow chart of FIGS. 2(a) and 2(b), the data converting routine will be described in detail. Initially, no data are stored in the cache memory 46, namely, no characters (no data associated with any input characters) are stored in the cache memory 46.

The control flow first goes to step S1 to determine whether or not the current content of the cache memory 46 includes data representative of the input character under examination (hereinafter referred to as "current character" or "relevant character", where appropriate). More specifically, step S1 is executed to determine whether or not any code data representative of the current character are stored in the control data area of the cache memory 46. Since no data for any character are initially stored in the cache memory 46, the control flow then goes to step S2 in which a set of vector data corresponding to the code data of the current character are retrieved from the VECTOR-FONT memory 42. Step S2 is followed by step S3 in which the retrieved vector data are converted into a set of dot data used for printing the character in the specified mode, according to the size data, attitude data and type style data of the current character which are stored in the input buffer 28.

The control flow then goes to step S4 to store the prepared dot data representative of the relevant character in the dot data area of the cache memory 46, and the print position data, size data, attitude data and type style data of the character in the control data area. Then, step S5 is implemented to store in the text memory 48 the print position data of the relevant character, and the address data representative of the address of the cache memory 46 at which the dot data representative of the relevant character are stored. The control flow then goes back to step S1.

Then, there will be described data converting operations where sets of data for different characters have been stored in the cache memory 46. When the data converting routine of FIGS. 2(a) and 2(b) is executed in this condition, the situation satisfies or meets one of the following eight cases specified in the table of FIG. 3:

a) Case 1

The cache memory 46 has already stored a character whose code data, size data, attitude data and type style data are identical with those of the current character under examination. This Case 1 is the First Case I described above.

b) Case 2a

The cache memory 46 has already stored a character whose code data, size data and attitude data are identical with those of the current character and whose type style data are different from those of the current character. Namely, the current character is different from the stored character in the type style. This Case 2a belongs to the Second Case II described above.

c) Case 2b

The cache memory 46 has already stored a character whose code data, size data and type style data are identical with those of the current character and whose attitude data are different from those of the current character. Further, the current character is upright while the stored character is left-turned, or the current character is left-turned while the stored character is upright. This Case 2b also belongs to the Second Case II.

d) Case 2c

The cache memory 46 has already stored a character whose code data and size data are identical with those of the current character and whose attitude data and type style data are different from those of the current character. Further, the current character is upright while the stored character is left-turned, or the current character is left-turned while the stored character is upright. This Case 2c also belongs to the Second Case II.

e) Case 3a

The cache memory 46 has not stored code data representative of the current character. Namely, the code data of the current character are not present in the cache memory 46. This Case 3a belongs to the Third Case III described above.

f) Case 3b

The cache memory 46 has already stored a character whose code data represent the current character but whose size data are different from those of the current character. Namely, the size of the current character is different from that of the stored character. This Case 3b also belongs to the Third Case III.

g) Case 3c

The cache memory 46 has stored a character whose code data and size data are identical with those of the current character and whose attitude data are different from those of the current character. Further, the current character is neither upright nor left-turned. This Case 3c also belongs to the Third Case III.

h) Case 3d

The cache memory 46 has stored a character whose code data and size data are identical with those of the current character and whose attitude data are different from those of the current data. Further, the current character is upright or left-turned, while the stored character is neither upright nor left-turned. This Case 3d also belongs to the Third Case III.

Each of the above eight different cases 1, 2a, 2b, 2c, 3a, 3b, 3c and 3d will be described in detail.

The Case 1 will be described first. In this case, the cache memory 46 has already stored a character whose code data, size data, attitude data and type style data are all identical with those of the current character.

In the Case 1, an affirmative decision (YES) is obtained in step S1, since a character (at least one character) whose code data represents the current character is present in the cache memory 46. As a result, step S6 is implemented to determine whether or not the size data of any stored character whose code data are identical with those of the current character are identical with those of the current character. An affirmative decision (YES) is obtained in step S6, and the control flow goes to step S7 to determine whether or not the attitude data of any stored character whose code and size data are identical with those of the current character are identical with those of the current character. An affirmative decision (YES) is obtained also in this step S7, and step S8 is executed to determine whether or not the type style data of any stored character whose code, size and attitude data are identical with those of the current character are identical with those of the current character. Since the cache memory 46 has stored the character whose code, size, attitude and type style data are all identical with those of the current character in this Case 1, an affirmative decision (YES) is obtained in step S8, and the control flow goes to step S5 to store in the text memory 48, the print position data of the current character, and the address data representative of the address of the cache memory 46 in which are stored the dot data of the character whose code, size, attitude and type style data are identical with those of the current character. In this Case 1, the control device 20 does not effect an operation to convert the vector data of the current character into the dot data, since the dot data are present in the cache memory 46.

Then, there will be described the Case 2a, in which the cache memory 46 has already stored a character whose code data, size data and attitude data are identical with those of the current case and whose type style data are different from those of the current character.

In the Case 2a, an affirmative decision (YES) is obtained in steps S1, S6 and S7, but a negative decision (NO) is obtained in step S8. In this case, the current character under examination has the standard style while the style of all stored characters whose code, size and attitude data are identical with those of the current character is the italic style, or the current character has the italic style while all of those stored characters have the standard style.

When the current character has the standard style while none of the stored characters have the standard style, the dot data (basic dot data) of the stored italic style character whose code, size and attitude data are identical with those of the current character are retrieved from the cache memory 46 in step S9 followed by step S8. Then, in step S10, the retrieved dot data of the italic style character are changed into dot data representative of the relevant character having the standard style. More specifically, the memory locations of the dot data area of the cache memory 46 in which the dot data of the italic character are stored are supposed to be arranged in a matrix of the memory locations which corresponds to a matrix of picture elements that defines each character with image dots formed at the selected picture element positions. The values ("1" or "0") of the dot data bits stored in the memory locations (hereinafter referred to as "middle row of the memory locations") corresponding to the height-wise centerline of the italic character remain unchanged, and the values of the dot data bits stored in the memory locations above the middle row of the memory locations are changed such that the dot data bits "1" are shifted to the memory locations to the left of the current memory locations, while the values of the dot data bits stored in the memory locations below the middle row are changed such that the dot data bits "1" are shifted to the memory locations to the right of the current memory locations. The number of the memory locations over which the dot data bits "1" are shifted to the left or right increases with the distance of the memory locations of the dot data bits "1" from the height-wise centerline of the italic character.

Where the current character has the italic style while none of the stored characters have the italic style, the dot data (basic dot data) of the stored standard style character whose code, size and attitude data are identical with those of the current character are retrieved from the cache memory 46 in step S9 followed by step S8. Then, in step S10, the retrieved dot data of the standard character are changed into corresponding dot data representative of the relevant character having the italic style. More specifically, the values of the dot data bits stored in the middle row of the memory locations remain unchanged, and the values of the dot data bits stored in the memory locations above the middle row are changed such that the dot data bits "1" are shifted to the memory locations to the right of the current memory locations, while the values of the dot data bits stored in the memory locations below the middle row are changed such that the dot data bits "1" are shifted to the memory locations to the left of the current memory locations. The number of the memory locations over which the dot data bits "1" are shifted to the left or right increases with the distance of the memory locations of the dot data bits "1" from the height-wise centerline of the italic character.

In either of the two situations in the Case 2a, step S10 is followed by step S4 in which the dot data obtained as a result of the dot data change in step S10 are stored in the cache memory 46, as the dot data representative of the current character.

By reference to FIGS. 4(a) and 4(b), an example of changing dot data representative of standard style character "L" into dot data representative of italic style character "L" will be described in detail.

In this example, each character is defined by a 5×5 matrix of dots or picture elements consisting of five columns and five rows, which corresponds to a 5×5 matrix of memory locations of the dot data area of the cache memory 46. The standard and italic characters "L" are represented by the dot data bits stored in the dot data area of the cache memory 46, as illustrated in FIGS. 4(a) and 4(b), respectively. In these figures, identification numbers of the memory locations which are enclosed in circles represent the memory locations which store the dot data bits "1" indicative of the presence of image dots formed at the appropriate picture elements. The identification numbers not circled represent the memory locations which store the dot data bits "0" indicative of the absence of image dots at the appropriate picture elements. The identification numbers identifying the 25 memory locations increase in the right direction along the rows of the matrix, and in the downward direction along the columns of the matrix.

For changing the dot data of the standard style character "L" into the corresponding dot data of the italic style character "L", the memory locations storing the dot data bits "1" are changed as follows. The values of the dot data bits stored in the third or middle row of the memory locations, i.e., in the memory locations Nos. 11 through 15 remain unchanged. The dot data bits "1" stored in the memory locations above the middle row of the matrix, i.e., in the memory locations Nos. 2 and 7 are shifted to the respective memory locations whose numbers are larger by one (1) than those of the memory locations Nos. 2 and 7, that is, shifted to the memory locations Nos. 3 and 8. At the same time, the dot data bits "1" stored in the memory locations below the middle row, i.e., in the memory locations Nos. 17 and 22-24 are shifted to the memory locations whose numbers are smaller by one (1) than those of the memory locations Nos. 16, 22-24, that is, shifted to the memory locations Nos. 16, 21, 22 and 23, respectively.

Figures 4A, 4B, 4C:
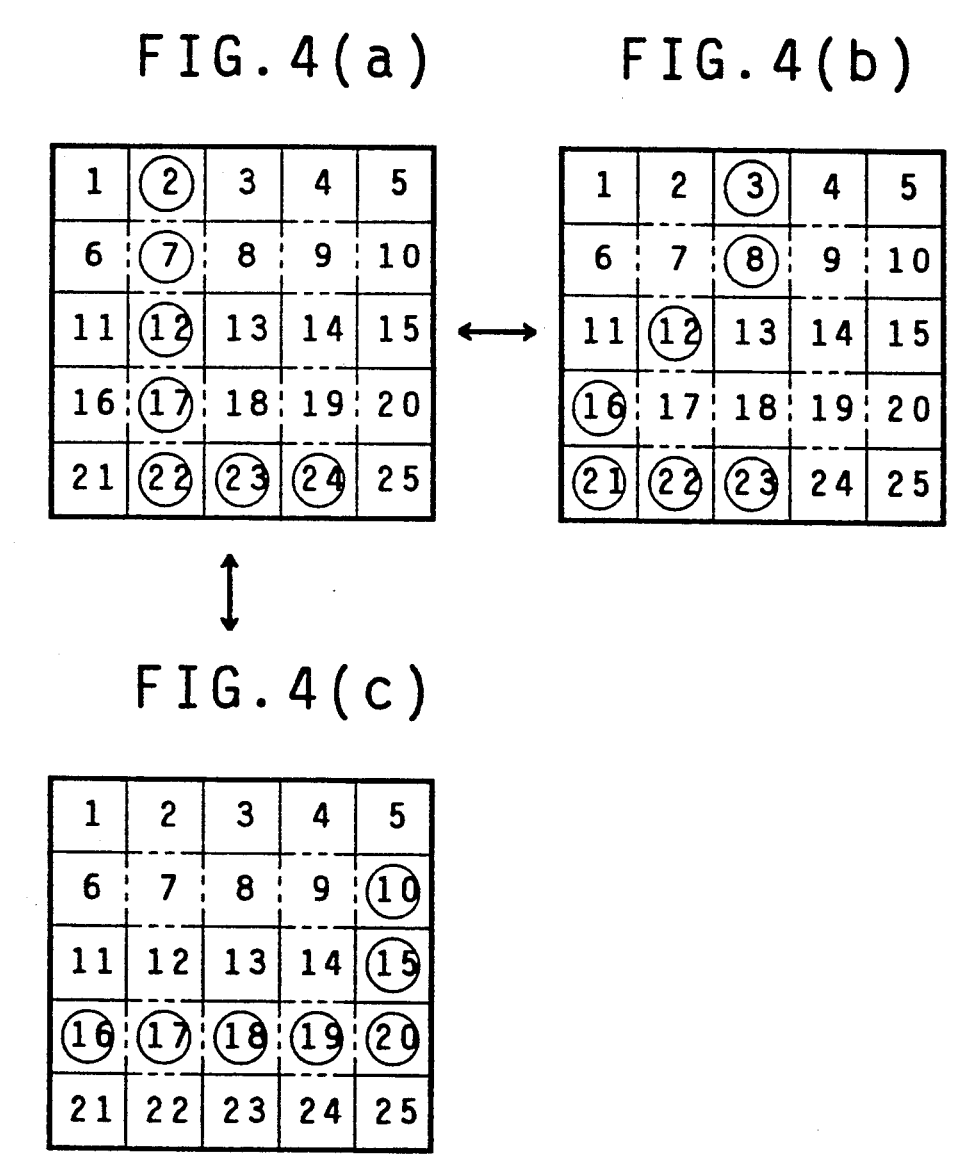

As a result, the dot data of the standard style character "L" including the bits "1" stored at the memory locations Nos. 2, 7, 12, 17 and 22-24 as indicated in FIG. 4(a) are changed to the dot data of the italic style character "L" including the bits "1" stored at the memory locations Nos. 3, 8, 12, 16 and 21-23 as indicated in FIG. 4(b).

In the above example where the 5×5 matrix of picture elements or memory locations is used for easy understanding, the dot data bits "1" stored at the memory locations above and below the middle row of the matrix are shifted to the right or left by the same distance corresponding to one memory location, irrespective of the distance from the middle row to the relevant rows. However, characters are usually defined by a matrix having more numbers of rows and columns, and the shifting distance of the bits "1" along the rows may vary with the distance of the relevant memory locations as measured from the middle row (height-wise centerline of the character) in the direction parallel to the columns.

In the Case 2b, the cache memory 46 has already stored a character whose code data, size data and type style data are identical with those of the current character under examination and whose attitude data are different from those of the current character. In this case, the current character is upright while the stored character is left-turned (90°-turned counterclockwise), or alternatively, the current character is left-turned while the stored character is upright.

In the Case 2b, therefore, an affirmative decision (YES) is obtained in steps S1 and S6, and a negative decision (NO) is obtained in step S7, whereby the control flow goes to step S11 to determine whether or not the current character is upright or left-turned (i.e., does not have an intermediate attitude between the upright and left-turned positions). In the present case, an affirmative decision (YES) is obtained in step S11, and the control flow goes to step S12 to determine whether or not the stored character whose code and size data are identical with those of the current character is left-turned (where the current character is upright) or upright (where the current character is left-turned). An affirmative decision (YES) is obtained in step S12.

Then, the control flow goes to step S13 to determine whether or not any stored character whose code and size data are identical with those of the current character and whose attitude data are different from those of the current character has the same type style as that of the current character. An affirmative decision (YES) is obtained in step S13, which is followed by step S14. Where the current character is upright, the dot data (basic dot data) of the character whose code, size and type style data are identical with those of the current character and which is left-turned are retrieved from the cache memory 46, in step S14. In the next step S15, the retrieved dot data of the left-turned character are changed into the dot data representative of the current upright character. Namely, the memory locations storing the dot data bits "1" representative of the left-turned character are changed such that the bits "1" are shifted to the respective memory locations which are reached by rotating clockwise the matrix of the memory locations of the dot data of the left-turned character, about the center of the matrix.

Where the current character under examination is left-turned and the stored character is upright, step S14 is implemented to retrieve the dot data (basic dot data) of the stored upright character whose code, size and type style data are identical with those of the current character. Step S14 is followed by step S15 in which the retrieved dot data of the upright character are changed into the dot data representative of the current left-turned character. That is, the memory locations storing the dot data bits "1" representative of the upright character are changed such that the bits "1" are shifted to the respective memory locations which are reached by rotating counterclockwise by 90° the matrix of the memory locations of the dot data of the upright character, about the center of the matrix.

An example of changing the dot data of upright character "L" into the dot data of left-turned character "L" will be described, by reference to FIGS. 4(a) and 4(c).

For changing the dot data of the upright character "L" into the dot data of the left-turned character "L", the dot data bits "1" and "0" stored at the 25 memory locations of the cache memory 46 are shifted to respective memory locations which are reached when the matrix of the memory locations of the dot data of the upright character is rotated counterclockwise by 90°, about the center memory location No. 13. As a result, the dot data including the bits "1" stored at the memory locations Nos. 2, 7, 12, 17 and 22-24 as indicated in FIG. 4(a) are changed to the dot data which include the bits "1" stored at the memory locations Nos. 10 and 15-20 as indicated in FIG. 4(c). Thus, the dot data representative of the left-turned character "L" can be obtained by changing the dot data representative of the upright character "L".

There will next be explained the Case 2c where the cache memory 46 has already stored a character whose code and size data are identical with those of the current character and whose attitude and type style data are different from those of the current character, and the current character is upright while the stored character is left-turned, or the current character is left-turned while the stored character is upright.

In the Case 2c, an affirmative decision (YES) is obtained in steps S1 and S6, and a negative decision (NO) is obtained in step S7. Further, an affirmative decision (YES) is obtained in steps S11 and S12, and a negative decision (NO) is obtained in step S13. Where the current character is upright, the dot data (basic dot data) of the left-turned character whose type style is different from that of the current character are retrieved from the cache memory 46 in step S16 following step S13. In the next step S17, the retrieved dot data of the left-turned character are changed into the dot data representative of the upright character, as described above with respect to the Case 2b. Step S17 is followed by step S18 in which the dot data changed in step S17 are further changed to the dot data representative of the character having the type style of the current character, as described above with respect to the Case 2a. Thus, the dot data representative of the current character are prepared. Where the current character is left-turned, the dot data of the upright character whose type style is different from that of the current character are retrieved from the cache memory 46 in step S16. In the next step S17, the retrieved dot data of the upright character are changed into the dot data representative of the left-turned character. In the next step S18, the dot data changed in step S17 are further changed to the dot data representative of the character having the type style of the current character. Thus, the dot data representative of the current character are prepared.

In the Case 3a where the cache memory 46 has not stord any character whose code data are identical with those of the current character, a negative decision (NO, is obtained in step S1, and the control flow goes to steps S2 and S3 to convert the vector data of the current character into corresponding dot data.

In the Case 3b where the cache memory 46 has already stored a character whose code data are identical with those of the current character and whose size data are different from those of the current character, an affirmative decision (YES) is obtained in step s1, and a negative decision (NO) is obtained in step S6, whereby steps S2 and S3 are implemented to prepare the dot data of the current character, by converting the vector data to the dot data, as in the Case 3a.

In the Case 3c, the cache memory 46 has already stored a character whose code and size data are identical with those of the current character and whose attitude data are different from those of the current character, while the current character is neither upright nor left-turned. In this case, an affirmative decision (YES) is obtained in steps S1 and S6, while a negative decision (NO) is obtained in steps S7 and S11, whereby steps S2 and S3 are implemented to prepare the dot data of the current character, by converting its vector data to the dot data, as in the Cases 3a and 3b.

In the Case 3d, the cache memory 46 has already stored a character whose code and size data are identical with those of the current character and whose attitude data are different from those of the current character, and the current character is upright or left-turned while the stored character is neither upright nor left-turned. In this case, an affirmative decision (YES) is obtained in steps S1 and S6, and a negative decision (NO) is obtained in step S7. Further, an affirmative decision (YES) is obtained in step S11, and a negative decision (NO) is obtained in step S12, whereby steps S2 and S3 are executed to prepare the dot data of the current character by converting its vector data to the dot data, as in the Cases 3a, 3b and 3c.

In the manner as described above, a batch of dot data representative of one page of text to be printed on a recording medium are prepared, on a character by character basis, and the print position data and the address data indicative of the addresses of the cache memory 46 are stored in the text memory 48 (step S5), according to the contents of the cache memory 46. The batch of dot data representative of the one page of text are stored in the page memory 50, based on the contents of the text memory 48. Then, the laser print head of the printer is operated to print the text, one line after another, according to the dot data stored in the page memory 50.

It will be understood from the foregoing description of the present embodiment that a batch of dot data for a text can be prepared in a reduced length of time, since the conversion of the vector data of a character into the dot data is omitted not only in the case where the content of the cache memory 46 includes the dot data for the relevant input character to be printed in the same size, same type style and same attitude as specified by the size, type style and attitude data of the relevant character, but also in the cases where the content of the cache memory 46 includes dot data (basic dot data) which permit the relevant character to be printed in the size as specified by the size data, but in the type style and attitudes different from those specified by the type style and attitude data of the relevant character. That is, the size, attitude and type style are considered to be the output conditions which determine the output mode in which each character is reproduced or outputted (i.e., printed). In the above-described three Cases 2a, 2b and 2c, at least one of the two output conditions, namely, attitude and type style is different between the character under examination to prepare its dot data, and a character already stored in the cache memory 46.

Figure 2A:
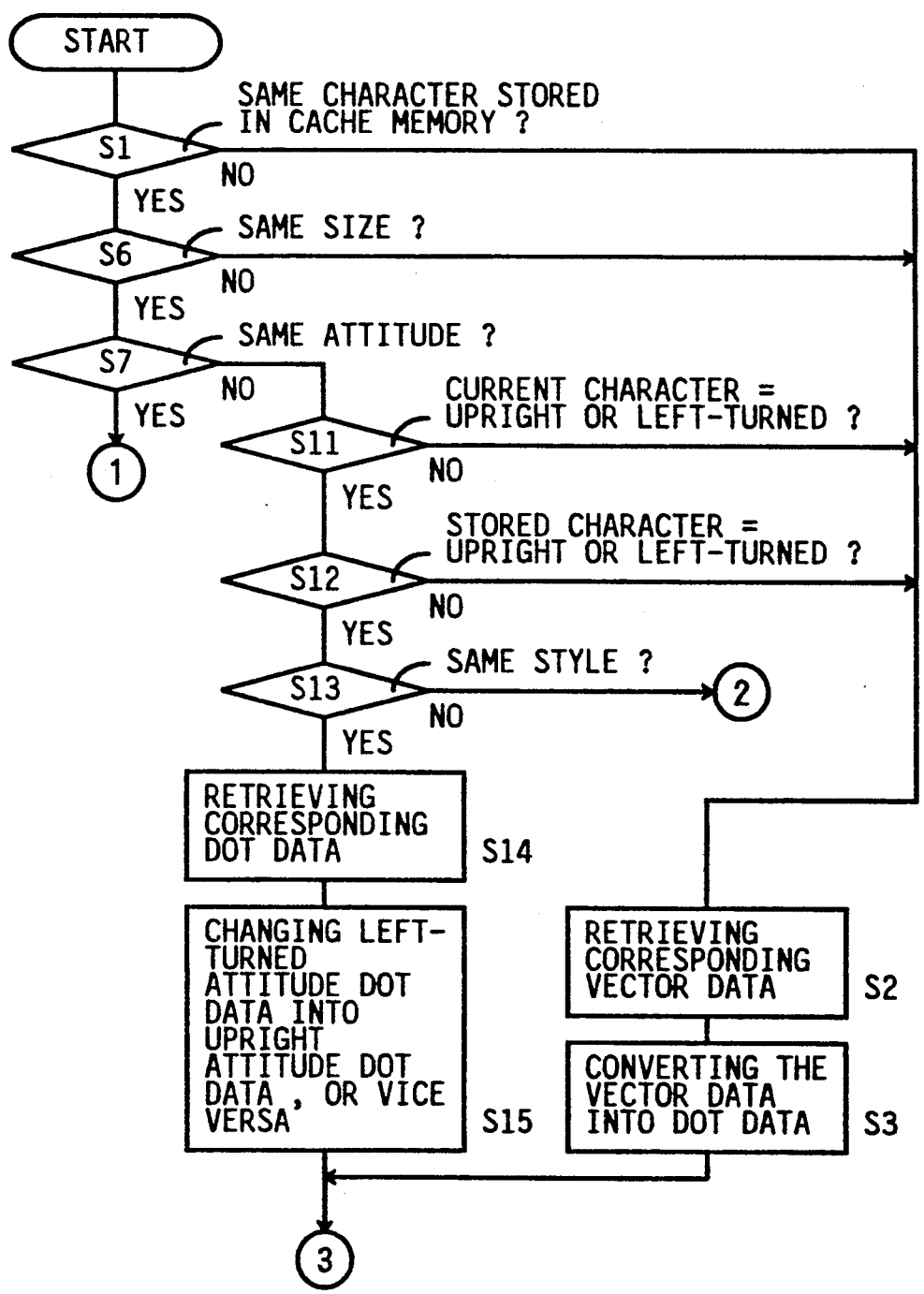
FIGS. 2(a) and 2(b) are flow charts illustrating a data converting routine according to a control program stored in a read-only memory of the control system of FIG. 1.
Figure 2B:
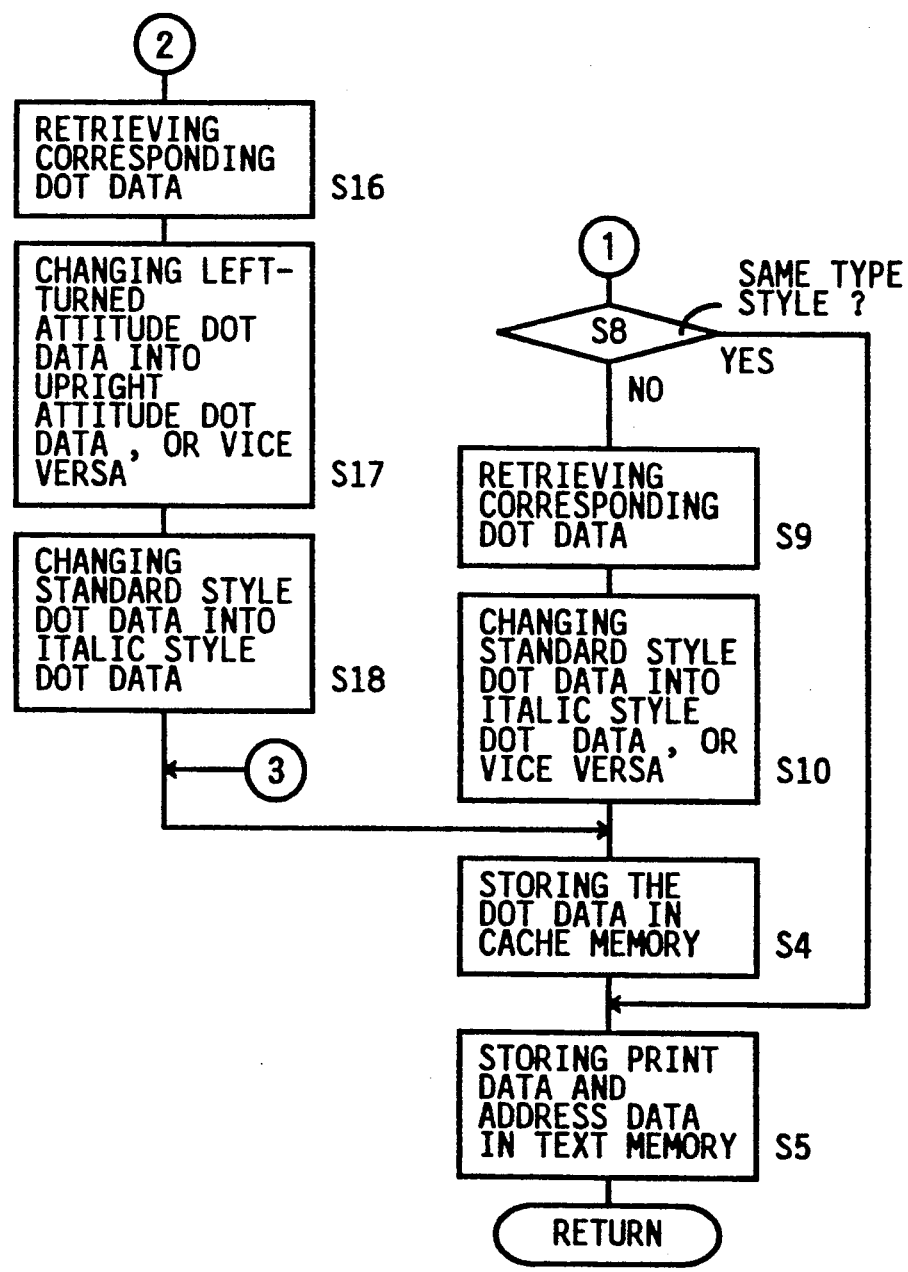
Figure 5:
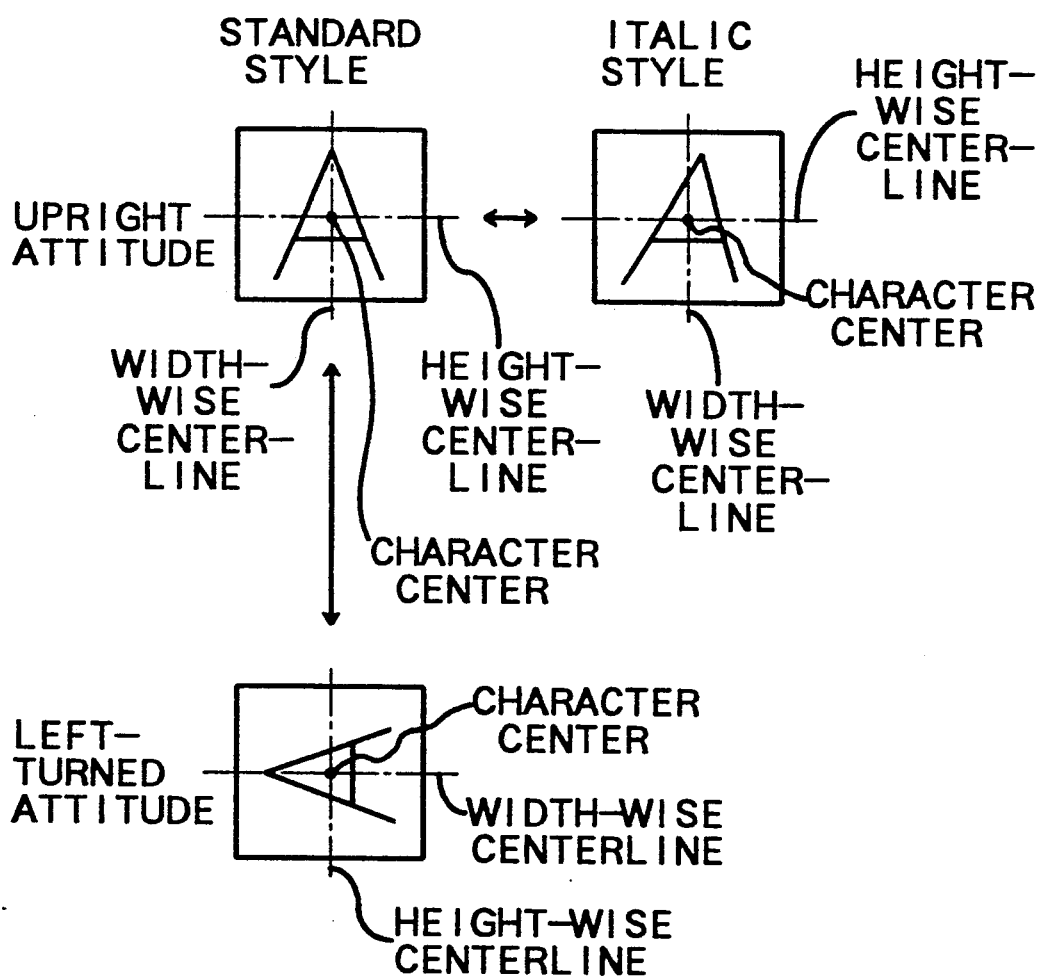
FIG. 5 is an illustration indicating three different output modes of character "A".

It will also be understood from the above description that V/D conversion means for converting vector data of an input character into dot data is constituted by the VECTOR-FONT memory 42, a portion of the computer of the main control device 20 assigned to read the size data, attitude data and type style data, and a portion of the computer assigned to execute steps S2 and S3 of the flow charts of FIGS. 2(a) and 2(b). Further, dot data memory means for storing the dot data is constituted by the cache memory 46, and a portion of the computer assigned to execute step S4 of the flow chart, and conversion control means is constituted by a portion of the computer assigned to execute steps S1, S6–S8 and S11–S13 of the flow chart. The conversion control means is adapted to determine which one of the above-indicated First, Second and Third Cases I (Case 1), II (Cases 2a, 2b, 2c) and III (Cases 3a, 3b, 3c and 3d) is currently satisfied or exists, and control the V/D conversion means depending upon the currently satisfied case. Further, dot data changing means for changing basic dot data stored in the dot data memory means is constituted by a portion of the computer assigned to execute steps S9, S10 and S14–S18.

In the present embodiment, the basic dot data which are stored in the cache memory 46 and which represent an output character whose output condition or conditions is/are different from that/those of the current character under examination are changed into the output dot data that can be used for printing the character in the specified mode (in the specified attitude and type style). The output dot data are stored in the cache memory 46. According to this arrangement wherein a plurality of sets of dot data representative of the same characters having different type styles and/or attitudes are stored in the cache memory 46, not only the frequency of data processing operations required to convert vector data into dot data, but also the frequency of data processing operations required to change the basic dot data into the output dot data are reduced. However, the sets of output dot data obtained as a result of changing the basic dot data should not necessarily be stored as the basic dot data in the cache memory 46. For instance, if the standard and italic type styles are available for each character, it is sufficient that the cache memory 46 is adapted to store only the dot data representative of each character having either the standard type style or the italic type style. This arrangement results in increasing the frequency of data processing operations required to change the basic dot data, but makes it possible to increase the number of different characters whose dot data are stored in the cache memory 46 having a given capacity. In other words, the required capacity of the cache memory 46 can be reduced, and the main control device 20 may be available at a reduced cost.

While the presently preferred embodiment of the present invention has been described in detail, it is to be understood that the invention may be embodied with various changes, modifications and improvements, which may occur to those skilled in the art.

What is claimed is:

1. A data converting apparatus operated according to code data representative of an input character, comprising:

data conversion means for converting vector data representative of an outline of said input character into dot data for reproducing the input character in a specified output mode on an output medium;

dot data memory means for storing the dot data prepared by the data conversion means;

conversion control means operated prior to the conversion of said vector data into said dot data by the data conversion means, for determining which one of a first case, a second case and a third case is satisfied, said first case being satisfied when the dot data for reproducing said input character in said specified output mode are stored in said dot data memory means, said second case being satisfied when the dot data for reproducing said input character in a different output mode different from said specified output mode are stored as basic dot data in said dot data memory means, said third case being satisfied when said dot data memory means stores none of said dot data reproducing said input character in said specified output mode and said basic dot data;

said conversion control means inhibiting an operation of said data conversion means to convert said vector data into said dot data in said first and second cases, said conversion control means activating, in said third case, said data conversion means to convert said vector data into said dot data; and dot data changing means responsive to said conversion control means and operated in said second case, for changing said basic dot data according to a predetermined rule depending upon said specified and different output modes, to obtain said dot data for reproducing said input character in said specified output mode.

2. A data converting apparatus according to claim 1, wherein said data conversion means includes vector data memory means for storing sets of vector data corresponding to respective sets of code data wherein said respective sets of code data are representative of characters, means for reading the vector data which correspond to one of said sets of code data representative of said input character, and means for converting the vector data of said input character into said dot data for reproducing said input characters in said specified output mode, according to at least one of attitude data and type style data, said attitude data being representative of one of a plurality of attitudes of said input character as reproduced, said type style data being representative of one of a plurality of type styles of said input character as reproduced, said at least one of said attitude data and said type style data determining said specified output mode.

3. A data converting apparatus according to claim 2, wherein said data conversion means converts said vector data into said dot data, further according to size data representative of one of a plurality of sizes in which said input character is reproduced.

4. A data converting apparatus according to claim 2, wherein said conversion control means includes means for determining that said first case is satisfied if said specified output mode specified by said at least one of said attitude data and said type style data for said input character is identical with an output mode of any character stored in said dot data memory means and having the same outline as said input character, and determining that said second case is satisfied if said specified output mode is different from the output mode of said any character.

5. A data converting apparatus according to claim 4, wherein said plurality of attitudes includes a nominal attitude, and an inclined attitude, said inclined attitude being rotated from said nominal attitude by a predetermined angle, said dot data changing means including means for changing, in said second case, said basic dot data such that an attitude of a character represented by said basic dot data is rotated from one of said nominal and inclined attitudes to the other of said nominal and inclined attitudes, so that an attitude of the character represented by the dot data obtained by changing said basic dot data coincides with an attitude represented by said attitude data of said input character.

6. A data converting apparatus according to claim 5, wherein said plurality of type styles includes a standard type style, and a special type style wherein the outline of said input character is shifted from that of said standard type style in a predetermined manner, said data changing means including means for changing, in said second case, said basic dot data such that an outline of the character represented by said basic dot data is shifted to the outline of said input character represented by said vector data of said input character.

7. A data converting apparatus according to claim 1, wherein said dot data memory means includes a cache memory having memory locations assigned to store dot data defining dot data bits, each of said dot data bits indicating at least one of the presence and absence of an image dot, said image dot to be formed at at least one corresponding position of a matrix of picture elements for defining each input character in a matrix of dots, said dot data changing means changing said memory locations of said dot data bits of said basic dot data stored in said dot data memory means, according to said predetermined rule, wherein positions of the image dots represented by the dot data obtained by said dot data changing means are changed with respect to the positions of the image dots represented by said basic dot data, wherein the number of said image dots remains the same.

8. A data converting apparatus according to claim 7, wherein said specified and different output modes of said input character is determined by at least one of attitude data and type style data, said attitude data being representative of an attitude of said input character as reproduced, said type style data being representative of a type style of said input character as reproduced, said dot data changing means changing said memory locations of said dot data bits of said basic dot data according to a change of at least one of said attitude data and type style data of said input character from at least one of the attitude data and type style data wherein at least one of attitude data and type style data is stored in said cache memory to specify said output mode of a character represented by said basic dot data.

9. A data converting apparatus according to claim 1, further comprising means for storing in said dot data memory means the dot data obtained in said second case by said dot data changing means by changing said basic dot data according to said predetermined rule.

10. A data converting apparatus operated according to code data representative of an input character, comprising:

data conversion means for converting vector data representative of an outline of said input character into dot data for reproducing the input character in a specified output mode on an output medium, said dot data consisting of data bits corresponding to respective picture elements in a matrix of dots said data bits being indicative of the presence or absence of image dots to be formed at positions of said matrix of dots, so as to define said input character;

dot data memory means for storing the dot data prepared by the data conversion means;

conversion control means operated prior to the conversion of said vector data into said dot data by the data conversion means, for determining which one of a first case, a second case and a third case is satisfied, said first case being satisfied when the dot data for reproducing said input character in said specified output mode are stored in said dot data memory means, said second case being satisfied when the dot data for reproducing said input character in a different output mode different from said specified output mode are stored as basic dot data in said dot data memory means, said third case being satisfied when said dot data memory means stores none of said dot data reproducing said input character in said specified output mode and said basic dot data;

said conversion control means inhibiting, in said first and second cases, an operation of said data conversion means to convert said vector data into said dot data in said first and second cases, said conversion control means activating, in said third case, said data conversion means to convert said vector data into said dot data;

dot data changing means responsive to said conversion control means and operated in said second case, for changing said basic dot data according to a predetermined rule depending upon said specified and different output modes, to obtain said dot data for reproducing said input character in said specified output mode; and said dot data changing means changing values of data bits of said basic dot data according to said predetermined rule wherein positions of the image dots represented by the dot data obtained by said dot data changing means are changed with respect to the positions of the image dots represented by said basic dot data, wherein the number of said image dots remains the same.

* * * * *